United States Patent [19]
Munro et al.

[11] Patent Number: 6,128,204
[45] Date of Patent: Oct. 3, 2000

[54] LINE POWER UNIT FOR MICROPOWER GENERATION

[75] Inventors: James L. Munro, Dunkirk; Thomas C. Underwood, Laurel, both of Md.; Thomas C. Matty, North Huntingdon, Pa.; William B. Hall, Annapolis; Edward T. Wagner, Chestertown, both of Md.

[73] Assignee: Northrop Grumman Corporation, Los Angeles, Calif.

[21] Appl. No.: 09/140,393

[22] Filed: Aug. 26, 1998

[51] Int. Cl.[7] ............................... H02M 1/12; H02P 5/20
[52] U.S. Cl. ............................ 363/41; 363/37; 318/140
[58] Field of Search ................................. 363/40, 41, 97, 363/98, 131, 132, 37; 318/140, 145, 147, 375

[56] References Cited

U.S. PATENT DOCUMENTS

| | | | |
|---|---|---|---|
| 5,903,116 | 5/1999 | Geis et al. | 318/140 |
| 5,905,644 | 5/1999 | Blasko et al. | 363/41 |

*Primary Examiner*—Jessica Han

[57] ABSTRACT

A line power unit controls electrical power delivery to a grid from a three phase permanent magnet generator. A line power unit controller receives a power level command and controls a main inverter that draws DC power from a DC bus to deliver the commanded power to a grid. The DC bus is fed DC voltage via a three phase permanent magnet generator and a rectifier. The inverter delivers power to the grid via a filter, transformer and main contactor. The line power unit controller also controls the main contactor to break the connection with the grid. A precharge circuit draws power from the grid to precharge the DC bus to a precharge voltage. Alternatives include a start inverter separate from the main inverter that permits simultaneous delivery of power to the grid and commutation of the permanent magnet generator as a motor to spin an engine connected thereto at a speed sufficient to permit engine starting. Another alternative utilizes a single inverter for engine starting and power delivery which does not permit these operations to be simultaneously performed. Further alternatives include eliminating the transformer by utilizing a high-voltage rated main inverter.

29 Claims, 4 Drawing Sheets

LINE POWER UNIT FOR MICROPOWER GENERATION

BACKGROUND OF THE INVENTION

1. Technical Field of the Invention

This invention relates to electric power generation particularly on a small scale. This invention further relates to power conversion circuits that convert multi-phase electrical power generated by a permanent magnet generator into controlled electrical power that is fed to a local grid.

2. Description of Related Art

The deregulation of the electric utility industry has created a need for small-scale electrical power generation and the feeding of such power to the utility grid. Conventional small-scale electrical power generation systems typically utilize a diesel engine driven generator. Such generators typically have no control over how much power is delivered to the utility grid and, instead, feed the grid according to the load up to the maximum output power that the generator is capable of producing.

Recently, small scale turbines have been manufactured by companies to drive electrical generators. For example, Allied Signal manufactures a microturbine that is compact and highly efficient. Such turbines maximize efficiency if they can be run at a desired operating point.

As shown in FIG. 5, DC link converters for transforming electrical power are generally known. A DC link converter is essentially an AC/AC converter that utilizes a DC link. More particularly, a first voltage wave form $V_1 \sin\omega_1 t$ is rectified into a DC voltage that is supplied to a DC link. The energy storage element (capacitor) located on this DC link provides more than filtering. The capacitor may also store any momentary mismatch in energy between the input and output power. This function is typically referred to as load balancing energy storage. The DC voltage on the DC bus may then be converted to a AC voltage by an inverter (labeled DC/AC converter in FIG. 5). The result is a desired AC wave form that may be expressed as $V_2 \sin\omega_2 t$. Some uninterruptable power supplies (UPS) utilize a large DC bus capacitor C that is large enough to support the continued operation of the system in the event of a power failure.

There is a need for improved power conversion circuitry that is intended for electrical power generation on a small scale. More particularly, there is a need for generating electricity on a small scale wherein the electrical power that is generated is subject to a high degree of control such that the engine driving the generator can be operated at maximum efficiency while permitting withdrawal of a desired level of power from the generator when fed to a grid. Furthermore, there is a need for an apparatus that controls the supply of generated electrical power to the grid that permits a power level command to be entered by an operator wherein the apparatus automatically supplies such requested power at the correct line frequency and power factor, etc. to the utility grid.

Furthermore, conventional electrical generation systems do not permit starting of the engine by utilizing either power supplied from the grid or power from a secondary DC power source. Still further, there is no provision in the conventional art for simultaneously supplying power to a start inverter and supplying power to a grid.

SUMMARY OF THE INVENTION

It is an object of the invention to control delivery of power from a permanent magnet generator to a grid. It is a further object of the invention to provide a power conversion topology that utilizes separate inverters for three-phase power conversion and engine starting. It is a further object of the present invention to deliver a commanded power level to a utility grid from the permanent magnet generator while maintaining the engine driving the generator at a maximum efficiency.

To achieve these objects, the present invention provides a circuit topology that controls the flow of power between a mechanically driven three-phase permanent magnet generator, a three-phase distribution grid and a source of DC voltage.

To further achieve the above objects, the invention utilizes a line power unit including a utility interface, starter and line power unit controller. The utility interface provides an interface between a main inverter and a utility grid while the starter is responsible for starting the engine by driving the permanent magnet generator as a motor to spin the engine and permit engine starting. A line power unit controller provides coordinated control that permits an operator to set a desired power level utilizing a power level command while monitoring the functions of the various components such as output voltage, current, and phase as well as utility authorization and data relating to engine performance.

Three-phase electrical power from the permanent magnet generator is rectified into a DC voltage whose characteristics can then be controlled via a main inverter. The line power unit controller controls the operation of the main inverter to supply power at a command power level. This commanded power is then delivered to a transformer to step up the voltage to a utility grid voltage. A contactor under the control of the line power unit controller brings the system on and off line with respect to the grid. Furthermore, a precharging unit precharges a DC bus that connects the rectifier to the inverter.

A separate start inverter draws power from either the grid or an external back up DC voltage supply to drive the permanent magnet generator as a motor to rotate the engine and thereby permit starting of the engine. In this way, the power generation system can be started even if there is no power on the utility grid. Furthermore, by providing a starting inverter separate from the main inverter, the system permits simultaneous starting and delivery of power to the utility.

The line power unit controller also has external communication equipment permitting a remote host to control the entire system. This is provided via an I/O controller and LPU external interface. A local display permits a local operator to monitor the system.

Furthermore, the line power unit controller communicates with an engine control unit that controls the engine driving the permanent magnet generator.

Alternative embodiments are also disclosed such as an alternative which eliminates the transformer by utilizing a main inverter with a high voltage rating. Further alternatives include utilizing a single inverter together with a solid state or mechanical relay and second contactor unit that permits a single inverter to both spin the engine by driving the permanent magnet generator as a motor and to deliver power from the permanent magnet generator once the engine is started. Appropriate control of the relays and contactors is provided by the line power unit controller to coordinate the starting and power generation phases of the system operation.

Combinations of these alternatives are disclosed herein.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
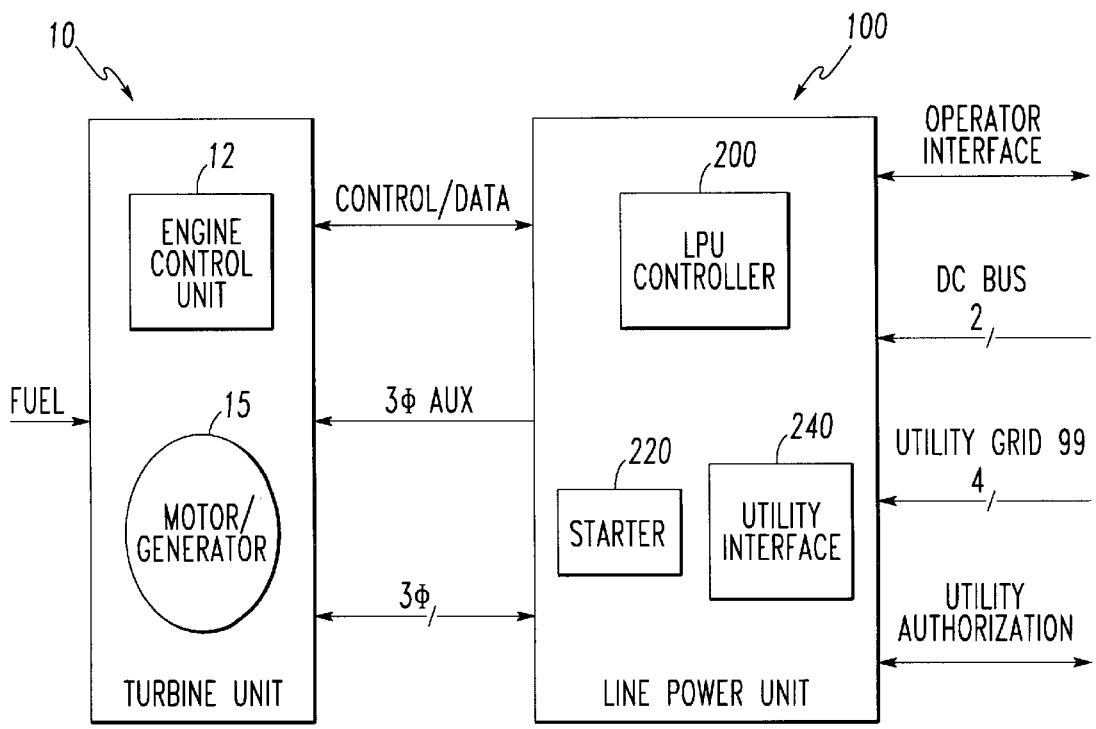
FIG. 1 is a high-level block diagram illustrating the major components of a microturbine generator system according to the invention.
Figure 5:
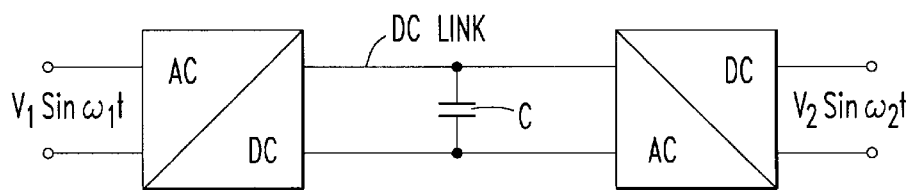
FIG. 5 illustrates a conventional ac/ac converter topology utilizing a DC link.

FIG. 1 illustrates the major components of the inventive line power unit 100 and the overall relationship to a microturbine generator invention in which the invention may be incorporated. The microturbine generator system includes two major components: the turbine unit 10 and the line power unit 100 may be arranged as shown in FIG. 1.

The turbine unit 10 includes a motor/generator 15 and an engine control unit 12. The turbine unit 10 is supplied with fuel. For example, the motor/generator 15 may be constructed with an Allied Signal Turbo Generator™ which includes a turbine wheel, compressor, impeller and permanent magnet generator which are all mounted on a common shaft. This common shaft is supported by an air bearing which has a relatively high initial drag until a cushion of air is developed at which point the air bearing is nearly frictionless.

The motor (engine) in the motor/generator 15 is controlled by the engine control unit 12 which, for example, throttles the engine according to the demand placed upon the generator. Communication is provided between the turbine unit 10 and the line power unit 100 as shown by the control/data line connecting these units in FIG. 1. This data includes operating data such as turbine speed, temperature etc. as well as faults, status and turbine output.

The motor/generator 15 supplies three-phase (3φ) electrical power to the line power unit 100 as further shown in FIG. 1. The line power unit 100 also supplies three-phase auxiliary power (3φ Aux) to the turbine unit 10.

The line power unit 100 contains three basic components. The line power unit controller 200, starter 220 and utility interface 240 are all included within line power unit 100. Furthermore, an operator interface that permits an operator to monitor and control the line power unit is further provided. The operator interface may include a front panel display for displaying critical operating data as well as controls such as a shut down switch and power level command input as further described below.

A DC bus supplies DC power to the line power unit 100 to permit off-grid starting of the turbine unit. Furthermore, the utility interface 240 supplies three-phase electrical power to the utility grid 99 as well as an optional neutral line. The line power unit 100 also receives utility authorization from a utility company which authorizes connection to the grid 99.

Figure 2:
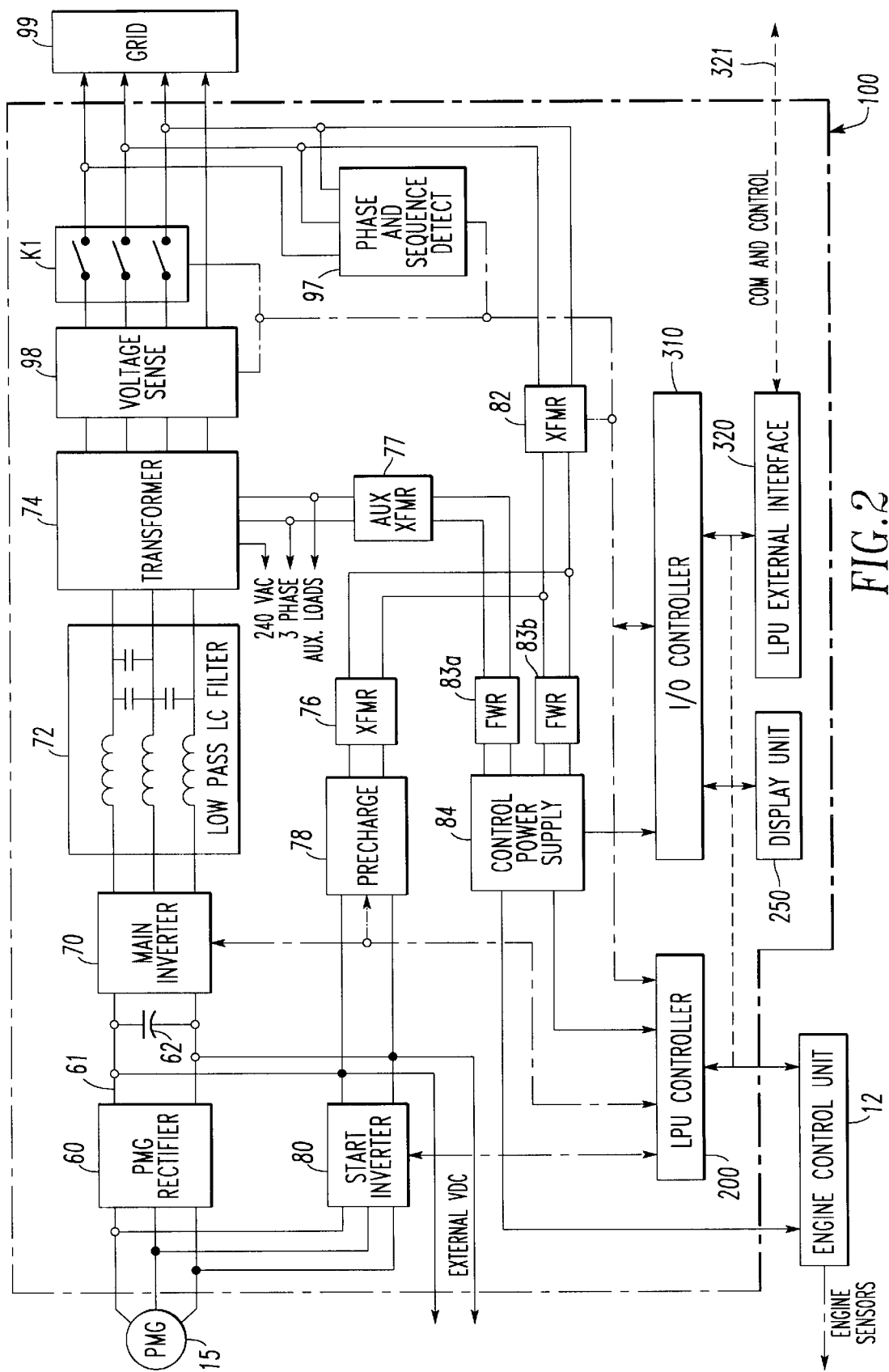
FIG. 2 is a detailed circuit diagram of a first embodiment of a line power unit according to the invention.
Figure 3:
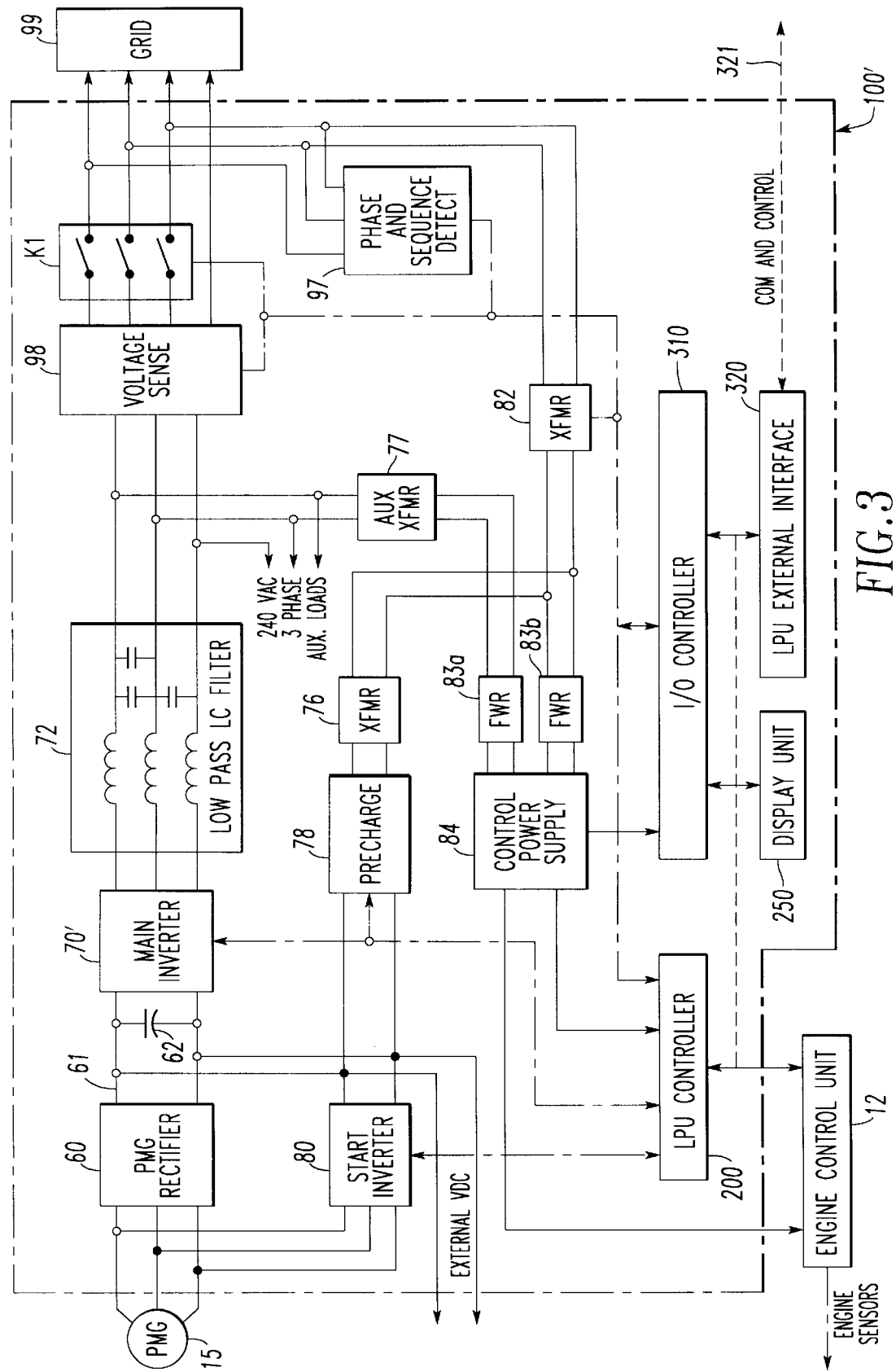
FIG. 3 is a detailed circuit diagram of a second embodiment of a line power unit according to the invention.
Figure 4:
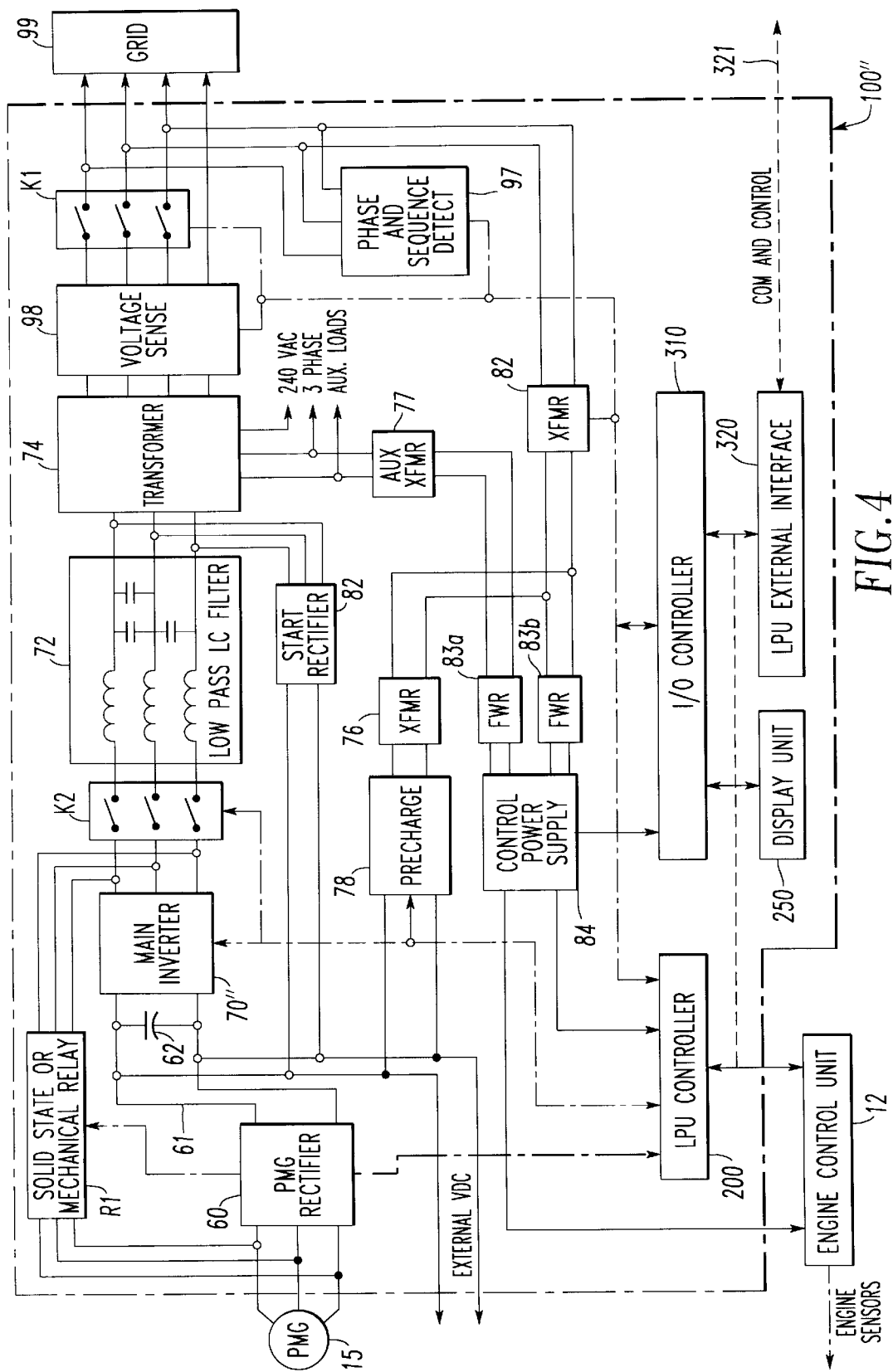
FIG. 4 is a detailed circuit diagram of a third embodiment of a line power unit according to the invention utilizing a single inverter.

FIG. 2 shows the details of the inventive line power unit 100 and its connections to the permanent magnet generator 15, engine control unit 12 and utility grid 99. The starter unit 220 is generally comprised of start inverter 80, precharge circuit 78, transformer 76, and transformer 82. The utility interface generally includes the main inverter 70, low pass filter 72, transformer 74, voltage sensor 98, and contactor K1. The LPU controller 200 generally includes phase and sequence detector circuit 97, transformer 82, full wave rectifier 83b, full wave rectifier 83a, control power supply 84 and LPU controller 200. Correspondence between the general construction shown in FIG. 1 and the detailed embodiments shown in FIGS. 2–4 is not important. This description is merely for the purpose of orienting one of ordinary skill to the inventive system.

Turning to the details of the line power unit 100 construction, the permanent magnet generator 15 has all three phases connected to PMG rectifier 60. A DC bus 61 interconnects PMG rectifier 60 and main inverter 70. A capacitor 62 is connected across the DC bus 61.

The output of the main inverter 70 is connected to transformer 74 via low pass LC filter 72. A voltage sense circuit 98 is connected to the output of the transformer 74 and supplies sensed voltages to the LPU controller 200 utilizing the data line shown. The voltage sense circuit 98 does not interrupt the power lines as may be incorrectly implied in the drawings. Instead, the voltage sense circuit is connected across the lines between transformer 74 and contactor K1.

A contactor K1 is controlled by LPU controller 200 via a control line as shown in FIG. 1 and provides a switchable connection between transformer 74 and the utility grid 99. A neutral line may be tapped from transformer 74 as further shown in FIG. 2 and connected to the grid 99.

A separate start inverter 80 is connected to the DC bus 61 and the external DC voltage supply which may be constructed with a battery. The start inverter 80 is also connected to the permanent magnet generator 15.

A precharge circuit 78 is connected to the grid via transformer 76 and transformer 82. Precharge circuit 78 is further connected to the DC bus 61. The precharge circuit 78 has a control input connected to a control data line that terminates at the LPU controller 200 as shown.

The line power unit 100 also supplies power to a local grid (e.g., 240 VAC three phase supplying auxiliary of local loads) via transformer 74. This local grid feeds local loads and the turbine unit including pumps and fans in the turbine unit.

An auxiliary transformer 77 is also connected to the output of the transformer 74. The output of the auxiliary transformer 77 is fed to full wave rectifier 83 to supply DC voltage to the control power supply 84. The control power supply 84 supplies power to the engine control unit 12 and the LPU controller 200 as well as the I/O controller 310.

The I/O controller 310 is connected via data lines to the LPU controller 200. The I/O controller 310 is further connected to the engine control unit 12, display unit 250, and LPU external interface 320. The LPU external interface 320 has a connection for communication and control via port 321.

The LPU controller 200 has control lines connected to the start inverter 80, main inverter 70, precharge circuit 78, transformer 82, and contactor K1. Furthermore, data is also provided to the LPU controller 200 from control/data lines from these same elements as well as the phase and sequence detector 97 that is connected at the output of contactor K1.

The LPU controller 200 also communicates data and control signals to the engine control unit 12.

The engine control unit is supplied power from the control power supply 84 and communicates with engine sensors as shown.

Operation of the Invention

Start Phase

Before starting the engine, the DC bus 61 should be precharged. This is accomplished via precharge circuit 78 which operates under the control of LPU controller 200. More particularly, precharge circuit 78 is energized via transformer 76 which receives power from transformer 82 which, in turn, is connected to the grid as shown in FIG. 2. The LPU controller 200 controls precharge circuit 78 such that the DC bus 61 is precharged to a desired precharged voltage.

After the precharge cycle is complete, then the LPU controller 200 commands contactor K1 to close thereby connecting the line power unit 100 to the grid 99.

If the system utilizes an engine for driving the permanent magnet generator 15 such as a turbine, then this engine must be started after the precharge cycle is complete in order to begin delivering power to the grid 99. After completing the precharge cycle, the LPU controller 200 waits for receipt of a start command from port 321. Alternatively, an automatic mode could be utilized such that when the precharge cycle is complete, the system automatically starts the engine.

During the start phase, the flow of power is controlled by the LPU controller 200. This power flow follows a path from the grid 99 supplying fixed frequency three-phase AC power through closed contactor K1 to transformer 74. The transformer 74 steps the voltage down from the grid and supplies the stepped-down voltage to the low pass LC filter 72 and then to the main inverter 70.

The main inventor 70 full wave rectifies the three-phase AC voltage to develop a DC voltage on the DC bus 61. The main inverter 70 may be constructed with a conventional pulse width modulated inverter. The pulse width modulation control of the main inverter 70 is provided by the LPU controller 200 during power supply to the grid. During the start phase, however, the main inverter 70 serves as a passive rectifier. In this way, DC power is supplied to the DC bus 61 from which DC power can be drawn by the start inverter 80.

The start inverter 80 utilizes DC power from the DC bus 61 to commutate the permanent magnet generator 15 as a motor to spin the turbine. Spinning the turbine in this fashion permits the turbine to start under the control of engine control unit 12. Further details of this motor starting scheme are described in related application number (Attorney Docket No. 1215-380P) the contents of which are hereby incorporated by reference.

Power Supply to Grid

Once the engine has started power flow is then controlled by the LPU controller 200 as follows. The three-phase variable frequency permanent magnet generator 15 supplies power to the PMG rectifier 60 which develops a DC voltage that is supplied to the DC bus 61. This DC voltage is then converted to a fixed frequency AC voltage by the main inverter 70 under active pulse width modulation control by the LPU controller 200.

The phase and frequency of the AC voltage developed by main inverter 70 are matched to the phase and frequency of the grid 99. These processes are further described in related application Attorney Docket number 1215-381P the contents of which are hereby incorporated by reference. For the purposes of this system topology, it is sufficient to state that phase and frequency matching occurs in the main inverter 70 under the control of LPU controller 200 by utilizing the pulse width modulation techniques.

The output of the main inverter 70 is applied to the low pass LC filter 72 and thereafter to transformer 74. The transformer 74 matches the utility voltage level through a step-up voltage transformation. In other words, the transformer 74 allows the main inverter 70 output to match the utility voltage.

When the line power unit 100 is online, the line power unit controller 200 performs feedback current control by utilizing feedback current supplied by a current sensor located at an output side the main inverter 70. When the line power unit 100 is offline, however, the control exercised by the line power unit controller 200 changes. Specifically, the line power unit controller 200 performs feedforward voltage control by utilizing feedforward voltage supplied by a voltage sensor located at an input side of the main inverter 70. These current and voltage sensors for feedback current control and feedforward voltage control, respectively are part of the main inverter 70 and are not shown on the drawings.

One of the aspects of this invention is that an operator can command a desired power level and the system responds by supplying the commanded power to the grid. This process proceeds as follows.

First, the operator inputs a power level command via port 321. Details of a remote host and operator interface that permit an operator to input this power level command are described in related application Attorney Docket number 1215-381P the contents of which are hereby incorporated by reference. For the purpose of this invention, it is sufficient to note that the power level command is input via port 321 to the LPU external interface 320. This power level command is routed to the LPU controller 200 via I/O controller 310 and the data lines connecting these elements. When the LPU controller 200 receives the power level command it controls the system to supply the utility 99 via contactor K1 with the commanded power level.

This circuit topology in the line power unit 100 and the control exercised by the LPU controller 200 compensates for utility line voltage variations and for variations of the DC voltage due to variations in turbine speed. In other words, the DC voltage on the DC bus 61 varies according to the speed of the permanent generator 15 which, in turn, is being driven by an engine or other prime mover the speed of which may vary.

The LPU controller 200 compensates for such DC voltage variations on the DC bus 61 by pulse width modulation control of the main inverter 70 to maintain the commanded power level.

The LPU controller 200 also coordinates with the engine control unit 12 to maintain the commanded power level. This is accomplished by sending the power level command from the LPU controller 200 to the engine control unit 12. The engine control unit 12 then controls the engine to drive the permanent magnet generator at a speed commensurate with the power level command. When the engine has achieved the maximum efficiency operating point or at least a nominal operating point, then the engine control unit 12 sends response data to the LPU controller stating that a certain turbine speed has been achieved and specifying the maximum power that can be drawn from the permanent magnet generator 15.

The LPU controller 200 utilizes this data from the engine control unit 12 to ramp-up power drawn by the main inverter 70 from the permanent magnet generator 15 via a permanent magnet rectifier 60 until the commanded power level is achieved. If the commanded power level exceeds that which can be delivered by the permanent magnet generator 15, then the system will not output the commanded power level and this ramp-up of power will terminate at the maximum allowable power level.

The LPU controller 200 further coordinates with the engine control unit 12 by sending the maximum DC bus 61 operating voltage. The engine control unit 12 responds by controlling the turbine speed to keep the DC bus voltage within the maximum DC bus voltage permitted.

Starting Engine When Utility Not Available

One of the chief advantages of the line power unit 100 topology shown in FIG. 2 is the ability to generate power at the same time the engine is started. There are many occasions when the grid 99 voltage is zero due to utility failure, brownout, downed power lines, etc. The present invention has particular advantages in providing backup power during such events. Such events necessarily mean that, however, the turbine or engine cannot be started by utilizing power from the utility. To address this disadvantage of conventional systems, the present invention utilizes the construction described above and the operational control described below.

In general, the line power unit 100 generates output power from the main inverter at the same time the start inverter 80 is starting the engine via an external DC voltage source. This permits the engine to become the power source rather than continuously draining the external DC voltage source. The line power unit 100 can then operate until the utility is available or it can act as a voltage source in place of the utility. With this topology, the line power unit 100 can supply uninterruptable power to the utility grid 99 or the local grid by drawing from the external DC source until the turbine is operational.

This backup power supply operation proceeds as follows. The external DC voltage supply maintains voltage on the DC bus 61 which makes the precharge cycle unnecessary. The LPU controller 200 controls the start inverter 80 to draw DC power from the external DC voltage source and develop AC power that is supplied to the transformer 74 via LC filter 72. This backup power can be supplied to the local grid and, if the contactor K1 is closed, to the utility grid 99. The external DC voltage source may be constructed with a bank of batteries.

Like the main inverter 70, the start inverter 80 utilizes pulse width modulation to develop a three-phase AC wave form from the external DC voltage supply. In this way, the start inverter 80 commutates the permanent magnet generator 15 as a motor to spin the turbine. Spinning the engine permits the engine to be started under control of the engine control unit 12. Once the engine has been started, the LPU controller 200 shuts down the start inverter 80.

Simultaneous with this starting phase, the main inverter 70 draws power from the DC bus 61 that is supplied DC power from the external DC voltage source. In this way, the main inverter 70 can supply power to the local grid via transformer 74 simultaneous with the starting of the engine via start inverter 80. Thus, uninterruptible power is supplied to the local grid by drawing from the external DC voltage source until the turbine is operational. By closing contactor K1, uninterruptible power can also be supplied to the utility grid 99 via main inverter 70 during the start phase but this may quickly drain the energy from the external DC voltage source.

Once the engine is operational and running at least at a nominal operating speed, then the engine can be the power source that supplies power to the grid 99 via line power unit 100. This prevents the external DC voltage from being drained unnecessarily.

If the line power unit 100 is being utilized as an uninterruptable power supply for the grid 99, then the contactor K1 will remain closed throughout the starting phase. On the other hand, the line power unit 100 may be utilized as an emergency power source for a local grid. In this case, the contactor K1 remains open during the starting phase so that the external DC voltage source is not unnecessarily drained. When start has been achieved and the permanent magnet generator 15 is being driven by the engine, then the LPU controller 200 can close the contactor K1 to supply power to the grid 99 once again.

If there is an interruption in the connection to the utility grid 99 or the utility grid otherwise fails as determined by voltage sensor 98 and phase and sequence detector 97, the line power unit controller 200 continues power flow from the main inverter 70 in order to keep the local grid (e.g., 240 VAC three-phase two auxiliary loads) powered until the utility connection returns. This power flow will be out of the transformer 74 to supply auxiliary loads such as turbine fans, pumps etc. as well as through an auxiliary transformer 77 that supplies the control power supply 84 via full wave rectifier 83*a*.

In this way, the LPU controller 200 and I/O controller 310 as well as the engine control unit 12 are continuously supplied power via control power supply 84 even when the utility grid 99 fails.

When the grid 99 returns as measured by phase and sequence detection circuit 97 and voltage sensor 98 detecting a loss of phase and voltage, respectively and determined by LPU controller 200 connected thereto; then the LPU controller closes the main contactor K1 and switches from a voltage control mode to a current control mode for controlling the main inverter 70. Preferably, the LPU controller 200 waits for a predetermined time period (e.g. 30 seconds) before reconnecting to the grid.

As mentioned above, the voltage sensor 98 is capable of detecting a voltage drop on the grid 99 indicating a grid outage. Furthermore, the phase and sequence detector 97 detects a loss of phase on the grid 99. The phase and sequence detector 97 also detects a phase sequence error that occurs when the line power unit 100 is improperly connected to the grid 99. If any of these problems occur, then the line power unit 100 should be disconnected from the grid 99 by opening the main contactor K1 as described above.

Further details of such a utility outage ride through scheme are disclosed in related application (Attorney Docket number 1215-381P) which is hereby incorporated by reference.

Second Embodiment

FIG. 3 illustrates a second embodiment which is an alternative topology for the line power unit 100'. In the first embodiment shown in FIG. 2, the DC voltage on the DC bus 61 must be maintained within a certain range that permits less expensive low voltage switching devices to be used within the main inverter 70. In the exemplary implementation of the invention, the DC bus voltage is around 400V which allows for relatively inexpensive IGBT's to be utilized in the main inverter 70. The alternative shown in FIG. 3 has less stringent restrictions on the voltage range of the DC bus 61.

This goal is accomplished by using a high-voltage-rated main inverter 70' which utilizes switching devices (e.g., IGBT's) and inverter parts with a higher voltage rating than main inverter 70 shown in FIG. 1. With such a high-voltage-rated main inverter 70' as in FIG. 3, there is no need for a transformer. Thus, FIG. 3 differs from the embodiment shown in FIG. 2 in that there is no transformer 74 supplied in this alternative topology.

The disadvantage of the alternative topology shown in FIG. 3 is that without a transformer there is less filtering, noise rejection, and DC isolation. Furthermore, the high voltage main inverter 70' is more expensive than the main inverter 70 used in FIG. 2.

The operation of the second embodiment is essentially the same as the first embodiment. For details, refer to the detail operational description of the first embodiment above.

Third Embodiment

FIG. 4 illustrates a third embodiment which is an alternative topology to the topology utilized for the line power unit 100 shown in FIG. 2 and the line power unit topology 100' shown in FIG. 3. The basic difference in the third embodiment is that the line power unit 100" utilizes a single inverter 70" to deliver power to the utility grid 99 and to start the turbine.

The third embodiment also differs from the construction of the first embodiment as follows. The wires connecting the main inverter 70" and the low pass filter 72 are interrupted by contactor K2 which is under the control LPU controller 200. A solid state or mechanical relay R1 is connected across the PMG rectifier 60 and the main inverter 70" to provide an alternative current path around these elements. Furthermore, a start rectifier 82 is connected across the main inverter 70", contactor K2 and low pass LC filter 72. Otherwise, the construction of the line power unit 100" is identical to the line power unit 100 shown in FIG. 2.

The line power unit 100" operates differently from the first embodiment as follows. Once the engine is started and power is being supplied by the permanent magnet generator 15, the flow of power is the same as the first embodiment except that contactor K2 must be closed by the LPU controller 200 in order to interface with the utility grid 99. Furthermore, the solid state relay R1 must be open to prevent interference. Thus, the power flow path is from the permanent magnet generator to the permanent generator rectifier to the main inverter 70", through closed contactor K2, through low pass LC filter 72, stepped-up by transformer 74, voltage sensed by voltage sensor 98, through closed contactor K1 and to the grid 99.

During the engine starting phase, the contactor K2 must be opened by the LPU controller 200 so that the main inverter 70" can be used to implement the starting scheme similar to that described above. Furthermore, the relay R1 must be closed by LPU controller 200 during the starting phase. Thus, the power flow path for engine starting is from the utility grid 99 to transformer 74, start rectifier 82, main inverter 70", closed relay R1 and to the permanent magnet generator 1 that is driven as a motor to spin the turbine and thereby permit starting.

In summary, this alternative topology for the line power unit 100" requires a start rectifier 82, contactor K2, and relay R1 to direct power in the proper direction. This alternative topology in embodiment three lacks the ability to simultaneously power the turbine during starting and produce power for the local or utility grid 99 when the utility is not available. Due to the relative cost of the components and size of this topology, the third embodiment is not preferred.

After the starting phase has been completed, the relay R1 is opened and the contactor K2 closed by LPU controller 200 thereby permitting power to be supplied from the permanent magnet generator 15 to the utility gird 99.

Another alternative is a combination of the second and third embodiments wherein the transformer in FIG. 4 is removed and the main inverter 70" is constructed with a high voltage main inverter 70' like the one used in the second embodiment.

Other alternatives include consolidating the controllers. For example, the LPU controller 200, engine control unit 12, and I/O controller 310 may be constructed with a single master control unit. In other words, there is no need to separately provide controllers to perform the various control functions described above.

The invention being thus described, it will be obvious that the same may be varied in many ways. Such variations are not to be regarded as departure from the spirit and scope of the invention, and all such modifications as would be obvious to one skilled in the art are intended to be included within the scope of the following claims.

What is claimed is:

1. A line power unit for controlling electrical power delivery to a grid from a three phase permanent magnet generator, comprising:

a full wave rectifier operatively connected to the three phase permanent magnet generator, said full wave rectifier converting a three phase AC voltage from the three phase permanent magnet generator to a DC voltage;

a DC bus operatively connected to the output of said full wave rectifier;

an inverter operatively connected to said DC bus, said inverter functioning as a current source or as a voltage source and transforming the DC voltage to a controlled three phase alternating voltage;

an inductor unit operatively connected to the output of said inverter;

a first contactor unit selectively connecting and disconnecting said inductor unit to and from the grid;

a line power unit controller operatively connected to said inverter and a power level command input, said line power unit controller receiving a power level command from the power level command input and controlling said inverter to transform the DC voltage to the controlled three phase alternating voltage having the commanded power level; and a precharge circuit operatively interconnecting the grid and said DC bus, said precharge circuit taking power from the grid to precharge said DC bus to a precharge DC voltage.

2. The line power unit according to claim 1, wherein the grid is a local grid.

3. The line power unit according to claim 1, said precharge circuit including a transformer operatively connected to the grid, said line power unit controller monitoring the DC voltage on said DC bus and controlling said precharge circuit during a precharge cycle to achieve the precharge DC voltage on said DC bus.

4. The line power unit according to claim 1, further comprising:

an engine for driving said three phase permanent magnet generator; and a start inverter unit operatively connected to said DC bus and the three phase permanent magnet generator and having a control input from said line power unit controller, wherein upon completion of a precharge cycle, said line power unit controller closes said first contactor unit to connect the grid to said inductor unit and controls said start inverter to develop three phase AC power and thereby spin the permanent magnet generator as a motor to allow the engine to be started.

5. The line power unit according to claim 4, wherein said engine is a turbine.

6. The line power unit according to claim 1, further comprising:

a DC power source operatively connected to said DC bus, an engine for driving said three phase permanent magnet generator; and a start inverter unit operatively connected to said DC bus and the three phase permanent magnet generator and having a control input from said line power unit controller, wherein said start inverter unit develops three phase AC power from the DC power supplied to said DC bus by said DC power source and thereby spins the permanent magnet generator as a motor to allow the engine to be started, wherein said inverter develops three phase AC power from the DC power supplied to said DC bus simultaneously with said start inverter spinning the permanent magnet generator.

7. The line power unit according to claim 6, wherein said DC power source is a battery.

8. The line power unit according to claim 1, wherein the grid is a utility grid.

9. The line power unit according to claim 1, further comprising:

a prime mover for driving said three phase permanent magnet generator.

10. The line power unit according to claim 1, said line power unit controller controlling said inverter to match a phase and frequency of the grid.

11. The line power unit according to claim 1, said DC bus including a capacitor connected to the output of said full wave rectifier.

12. The line power unit according to claim 1, wherein said inductor unit further includes capacitors forming an LC filter unit.

13. A line power unit for controlling electrical power delivery to a grid from a three phase permanent magnet generator, comprising:

a full wave rectifier operatively connected to the three phase permanent magnet generator, said full wave rectifier converting a three phase AC voltage from the three phase permanent magnet generator to a DC voltage;

a DC bus operatively connected to the output of said full wave rectifier;

an inverter operatively connected to said DC bus, said inverter functioning as a current source or as a voltage source and transforming the DC voltage to a controlled three phase alternating voltage;

an inductor unit operatively connected to the output of said inverter;

a transformer operatively connected to said inductor unit;

a first contactor unit selectively connecting and disconnecting said transformer to and from the grid; and a line power unit controller operatively connected to said inverter and a power level command input, said line power unit controller receiving a power level command from the power level command input and controlling said inverter to transform the DC voltage to the controlled three phase alternating voltage having the commanded power level.

14. The line power unit according to claim 13, wherein the grid is a local grid.

15. The line power unit according to claim 13, wherein the grid is a utility grid.

16. The line power unit according to claim 13, further comprising:

a precharge circuit operatively interconnecting the grid and said DC bus, said precharge circuit taking power from the grid to precharge said DC bus to a precharge DC voltage.

17. The line power unit according to claim 16, further comprising:

an engine driving said three phase permanent magnet generator;

a second contactor unit operatively connected between said inverter and said inductor unit;

a relay operatively connected in parallel with said full wave rectifier and said inverter; and a start rectifier operatively connected to said transformer and to said DC bus, said start rectifier rectifying three phase AC voltage from said transformer to DC voltage and supplying the DC voltage to said DC bus.

18. The line power unit according to claim 17, wherein upon completion of the precharge cycle said line power unit controller opens said second contactor unit and closes said relay such that power flows from said start rectifier to said inverter, through said relay and to the permanent magnet generator, said line power unit controller controlling said inverter to develop three phase AC power and thereby spin the permanent magnet generator as a motor to allow the engine to be started.

19. The line power unit according to claim 18, wherein upon completion of the start cycle, said line power unit controller opens said relay, closes said second contactor, and supplies a power level command to said inverter.

20. The line power unit according to claim 17, further comprising:

a detector connected to the grid and to said line power unit controller, said detector detecting a grid outage, a loss of phase on the grid or a phase sequence error, said line power unit controller opening said first contactor and controlling said inverter in a voltage control mode when said detector detects the grid outage, loss of phase on the grid or phase sequence error, said line power unit controller closing said first contactor and controlling said inverter in a current control mode when said detector fails to detect grid outage or loss of phase on the grid for a predetermined time period.

21. The line power unit according to claim 17, wherein said DC power source is a battery.

22. The line power unit according to claim 17, wherein said engine is a turbine.

23. The line power unit according to claim 13, further comprising:

a prime mover for driving said three phase permanent magnet generator.

24. The line power unit according to claim 13, said line power unit controller controlling said inverter to match a phase and frequency of the grid.

25. The line power unit according to claim 13, said DC bus including a capacitor connected to the output of said full wave rectifier.

26. A line power unit for controlling electrical power delivery to a grid from a three phase permanent magnet generator, comprising:

a full wave rectifier operatively connected to the three phase permanent magnet generator, said full wave rectifier converting a three phase AC voltage from the three phase permanent magnet generator to a DC voltage;

a DC bus operatively connected to the output of said full wave rectifier;

an inverter operatively connected to said DC bus, said inverter functioning as a current source or as a voltage source and transforming the DC voltage to a controlled three phase alternating voltage;

an inductor unit operatively connected to the output of said inverter;

a first contactor unit selectively connecting and disconnecting said inductor unit to and from the grid;

a line power unit controller operatively connected to said inverter and a power level command input, said line power unit controller receiving a power level command from the power level command input and controlling said inverter to transform the DC voltage to the controlled three phase alternating voltage having the commanded power level; and a detector operatively connected to the grid and to said line power unit controller, said detector detecting a grid outage or a loss of phase on the grid, said line power unit controller opening said first contactor and controlling said inverter in a voltage control mode when said detector detects the grid outage or loss of phase on the grid, said line power unit controller closing said first contactor and controlling said inverter in a current control mode when said detector fails to detect grid outage or loss of phase on the grid for a predetermined time period.

27. The line power unit according to claim 26, said line power unit controller controlling said inverter to match a phase and frequency of the grid.

28. The line power unit according to claim 26, wherein the grid is a local grid.

29. The line power unit according to claim 26, wherein the grid is a utility grid.

* * * * *